(12) United States Patent
Yamane et al.

(10) Patent No.: US 8,869,367 B2
(45) Date of Patent: Oct. 28, 2014

(54) AIRCRAFT STRUCTURE MANUFACTURING APPARATUS

(75) Inventors: Shigemi Yamane, Aichi (JP); Kanehiro Kominami, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 602 days.

(21) Appl. No.: 13/203,034

(22) PCT Filed: Feb. 17, 2010

(86) PCT No.: PCT/JP2010/052383
§ 371 (c)(1),
(2), (4) Date: Aug. 24, 2011

(87) PCT Pub. No.: WO2010/098242
PCT Pub. Date: Sep. 2, 2010

(65) Prior Publication Data
US 2011/0302784 A1    Dec. 15, 2011

(30) Foreign Application Priority Data
Feb. 27, 2009   (JP) .................................. 2009-047305

(51) Int. Cl.
*B64F 5/00* (2006.01)
(52) U.S. Cl.
CPC .................................... *B64F 5/0009* (2013.01)
USPC .......................... 29/281.3; 29/281.1; 29/281.5
(58) Field of Classification Search
CPC .............................. B23Q 3/186; B64F 5/0009
USPC ........... 269/37; 29/281.1, 281.3, 281.5, 281.6
See application file for complete search history.

(56) References Cited

U.S. PATENT DOCUMENTS 4,200,273 A *  4/1980  Das Gupta et al. .............. 269/61
4,691,905 A *  9/1987  Tamura et al. ................... 269/45
(Continued)

FOREIGN PATENT DOCUMENTS

| CN | 1213998 | 4/1999 |
| CN | 1982040 | 6/2007 |

(Continued)

OTHER PUBLICATIONS

International Search Report issued Apr. 13, 2010 in International (PCT) Application No. PCT/JP2010/052383.

(Continued)

*Primary Examiner* — Lee D Wilson
*Assistant Examiner* — Tyrone V Hall, Jr.
(74) *Attorney, Agent, or Firm* — Wenderoth, Lind & Ponack, L.L.P.

(57) ABSTRACT

A first lift stand is provided with a first supporting unit to support a first portion of a positioning object, and a first servo system to drive the first supporting unit in a vertical direction. A second lift stand is provided with a second supporting unit to support a second portion of the positioning object, and a second servo system to drive the second supporting unit in the vertical direction. A third lift stand is provided with a third supporting unit to support a third portion of the positioning object, and a third servo system to drive the third supporting unit in the vertical direction. A fourth lift stand is provided with a fourth supporting unit to support a fourth portion of the positioning object, and a fourth servo system to drive the fourth supporting unit in the vertical direction.

6 Claims, 12 Drawing Sheets

(56) References Cited

U.S. PATENT DOCUMENTS

| | | | | |
|---|---|---|---|---|
| 4,792,738 | A * | 12/1988 | Yamazaki et al. | 318/630 |
| 4,822,014 | A * | 4/1989 | Buchler | 269/71 |
| 4,995,146 | A * | 2/1991 | Woods | 29/281.3 |
| 5,105,515 | A * | 4/1992 | Nelson | 29/281.3 |
| 5,659,939 | A * | 8/1997 | Whitehouse | 29/281.4 |
| 6,418,602 | B2 * | 7/2002 | Crocker et al. | 29/281.4 |
| 7,484,464 | B2 * | 2/2009 | Shen et al. | 108/56.3 |
| 7,866,642 | B2 * | 1/2011 | McAllister | 269/37 |
| 2001/0024603 | A1 * | 9/2001 | Stone et al. | 409/132 |
| 2002/0073535 | A1 * | 6/2002 | Radowick | 29/720 |
| 2002/0078545 | A1 * | 6/2002 | Munk et al. | 29/407.01 |
| 2007/0107189 | A1 * | 5/2007 | Prichard et al. | 29/448 |
| 2008/0205763 | A1 * | 8/2008 | Marsh et al. | 382/190 |
| 2009/0056109 | A1 * | 3/2009 | Prichard et al. | 29/701 |

FOREIGN PATENT DOCUMENTS

| | | |
|---|---|---|
| CN | 101362512 | 2/2009 |
| EP | 0 215 127 | 3/1987 |
| EP | 1 780 120 | 5/2007 |
| JP | 7-18405 | 1/1995 |
| JP | 07-018405 | 3/1995 |
| JP | 2000-034734 | 2/2000 |
| JP | 2000-506815 | 6/2000 |
| JP | 2000-506816 | 6/2000 |
| JP | 2007-125890 | 5/2007 |
| JP | 2008-7114 | 1/2008 |
| JP | 4128626 | 7/2008 |
| JP | 2009-47305 | 3/2009 |
| WO | 97/34733 | 9/1997 |
| WO | 97/34734 | 9/1997 |

OTHER PUBLICATIONS

Chinese Office Action issued Jun. 5, 2013 in corresponding Chinese Patent Application No. 201080009599.5 with partial English translation.

Canadian Notice of Allowance issued Sep. 10, 2013 in corresponding Canadian Patent Application No. 2,753,523.

Chinese Decision to Grant a Patent dated Jun. 25, 2014 issued in corresponding Chinese Application No. 201080009599.5 (with English translation).

European Search Report dated May 20, 2014 issued in corresponding European Application No. 10746123.8.

* cited by examiner

AIRCRAFT STRUCTURE MANUFACTURING APPARATUS

TECHNICAL FIELD

The present invention is related to a manufacturing technique of an aircraft.

BACKGROUND ARTS

Japanese Patent 4,128,626 and Japanese Patent Publication (JP 2008-7114A) disclose an assembling method of main wings of an aircraft. In a main wing assembling process, it is necessary to position a wing panel in a high accuracy, in order to attach the wing panel to a beam structure. It is desired to position the wing panel in a short time for reduction of man-hours.

CITATION LIST

[Patent Literature 1]: Japanese Patent 4,128,626
[Patent Literature 2]: JP 2008-7114A

SUMMARY OF THE INVENTION

The present invention provides an aircraft structure manufacturing apparatus and an aircraft structure manufacturing method, in which the positioning of an object can be carried out in a short time in a high accuracy.

The aircraft structure manufacturing apparatus according to a first aspect of the present invention is provided with: a first supporting unit configured to support a first portion of a positioning object; a second supporting unit configured to support a second portion of the positioning object; a third supporting unit configured to support a third portion of the positioning object; a fourth supporting unit configured to support a fourth portion of the positioning object; a servo system group; and a control unit configured to control the servo system group. The servo system group is provided with: a first vertical axis servo system configured to drive the first supporting unit in a vertical direction; a second vertical axis servo system configured to drive the second supporting unit in the vertical direction; a third vertical axis servo system configured to drive the third supporting unit in the vertical direction; and a fourth vertical axis servo system configured to drive the fourth supporting unit in the vertical direction.

Therefore, the positioning of a positioning object is carried out in a high accuracy in a short time by the plurality of servo systems. By using the aircraft building manufacturing apparatus according to the present invention, the positioning of a positioning object can be carried out in a short time in a high accuracy, compared with a case of using a crane.

Preferably, the positioning object is a jig configured to support a part of an aircraft structure. The servo system group is provided with: a first horizontal axis first servo system configured to drive the first supporting unit in a first horizontal direction; a second horizontal axis first servo system configured to drive the first supporting unit in a second horizontal direction orthogonal to the first horizontal direction; a first horizontal axis second servo system configured to drive the second supporting unit in the first horizontal direction; a second horizontal axis second servo system configured to drive the second supporting unit in the second horizontal direction; and a first horizontal axis third servo system configured to drive the third supporting unit in the first horizontal direction. A first rotation axis parallel to the vertical direction and a first 2-axis gimbal are provided between the first supporting unit and the first portion. A second rotation axis parallel to the vertical direction and a second 2-axis gimbal are provided between the second supporting unit and the second portion. A third rotation axis parallel to the vertical direction, a third the 2-axis gimbal and a 1-axis sliding mechanism are provided between the third supporting unit and the third portion. A fourth rotation axis parallel to the vertical direction, a fourth the 2-axis gimbal and the 2-axis sliding mechanism are provided between the fourth supporting unit and the fourth portion.

Therefore, a parallel movement of the positioning object in a vertical direction, a parallel movement thereof in a first horizontal direction, a parallel movement thereof in a second horizontal direction, a rotation around a rotation axis which is parallel to the vertical direction, a rotation around a rotation axis which is parallel to the first horizontal direction, and a rotation around a rotation axis which is parallel to the second horizontal direction are made possible.

Preferably, the positioning object is provided with the first to fourth 2-axis gimbals, the 1-axis sliding mechanism and the 2-axis sliding mechanism. The first 2-axis gimbal is provided with: a first gimbal base attached to the first portion; and a first swinging body supported by the first gimbal base to swing around 2 axes which are orthogonal to each other. A first pin which is arranged in a hole formed in the first swinging body and a first receiving base on which the first swinging body is put are provided for the first supporting unit. The first pin and the first swinging body form the first rotation axis. The second 2-axis gimbal is provided with: a second gimbal base attached to the second portion; and a second swinging body supported by the second gimbal base to swing around the 2 axes which are orthogonal to each other. A second pin which is arranged in a hole formed in the second swinging body and a second receiving base on which the second swinging body is put are provided for the second supporting unit. The second pin and the second swinging body form the second rotation axis. The 1-axis sliding mechanism is provided with: a first slide base attached to the third portion; and a first slide body configured to slide to the first slide base. The third 2-axis gimbal is provided with: a third gimbal base attached to the first slide body; and a third swinging body supported by the third gimbal base so as to swing around 2 axes which are orthogonal to each other. A third pin which is arranged in a hole formed in the third swinging body and a third receiving base on which the third swinging body is put are provided for the third supporting unit. The third pin and the third swinging body form the third rotation axis. The 2-axis sliding mechanism is provided with: a second slide base attached to the fourth portion; a slide intermediate body configured to slide in a first slide direction to the second slide base; and a second slide body configured to slide in a second slide direction, which is orthogonal to the first slide direction, to the slide intermediate. The fourth 2-axis gimbal is provided with: a fourth gimbal base attached to the second slide body; and a fourth swinging body supported in the fourth gimbal base to swing around 2 axes which are orthogonal to each other. A fourth pin which is arranged in a hole formed in the fourth swinging body and a fourth receiving base on which the fourth swinging body is put are provided for the fourth supporting unit. The fourth pin and the fourth swinging body form the fourth rotation axis.

Therefore, the positioning object is possible to separate from the supporting unit. Depending on a kind of the positioning object, it is not necessary to rotate the positioning object. Therefore, the positioning object is provided with the 2-axis gimbal, the 1-axis sliding mechanism and the 2-axis sliding mechanism which are necessary for the positioning object to rotate.

Preferably, the 1-axis sliding mechanism is provided with a first tension spring configured to return relative positions of the first slide base and the first slide body to a slide center position. The 2-axis sliding mechanism is provided with: a second tension spring configured to return relative positions of the second slide base and the middle slide body to a slide center position; and a third tension spring configured to return relative positions of the middle slide body and the second slide body to a slide center position.

Therefore, the positioning object can be easily transferred to the first to fourth supporting units from the AGV (Automated Guided Vehicle).

Preferably, the aircraft structure manufacturing apparatus is further provided with: a measure jig configured to support an attachment object portion of the aircraft structure to which the part should be installed. The control unit controls the servo system group such that the positioning object rotates around a vertical direction rotation axis which is parallel to the vertical direction and passes through a rotation center fixed to the attachment object portion, controls the servo system group such that the positioning object rotates around first horizontal direction rotation axis which is parallel to the first horizontal direction and passes through the rotation center, and controls the servo system group such that the positioning object rotates around a second horizontal direction rotation axis which is parallel to the second horizontal direction and passes through the rotation center.

Because a rotation center of the positioning object to support a part is fixed to an installation object portion, the adjustment to install a part to the installation object portion is easy.

It is desirable, the control unit is provided with a memory section configured to store stroke limitation data which limits a stroke of the servo system group. The control unit controls the servo system group based on the stroke limitation data.

Therefore, by changing the stroke limitation data, it is possible to perform a control based on a kind of positioning object.

Preferably, the control unit controls the servo system groups to perform a predetermined position holding operation when a movement of the positioning object specified by an operator conflicts with the stroke limitation data.

Therefore, it is prevented that the positioning object moves in a manner contrary to intension of the operator.

The method of manufacturing an aircraft structure according to a second aspect of the present invention, includes: executing positioning of first to fourth supporting units in a vertical direction independently by a servo system group; and supporting first to fourth portions of the positioning object by the first to fourth supporting units, respectively.

Therefore, the positioning of the positioning object is carried out in a high accuracy in a short time by the plurality of servo systems.

According to the present invention, the aircraft structure manufacturing apparatus and the aircraft structure production method are provided, in which the positioning can be carried out in a high accuracy in a short time.

BRIEF DESCRIPTION OF THE DRAWINGS

The above and other objects and the features and effects of the present invention are made clearer from the description of embodiments in conjunction with the attached drawings.

DESCRIPTION OF EMBODIMENTS

Hereinafter, an aircraft structure manufacturing apparatus and an aircraft structure generating method according to the present invention will be described in detail with reference to the attached drawings.

First Embodiment

Figure 1:
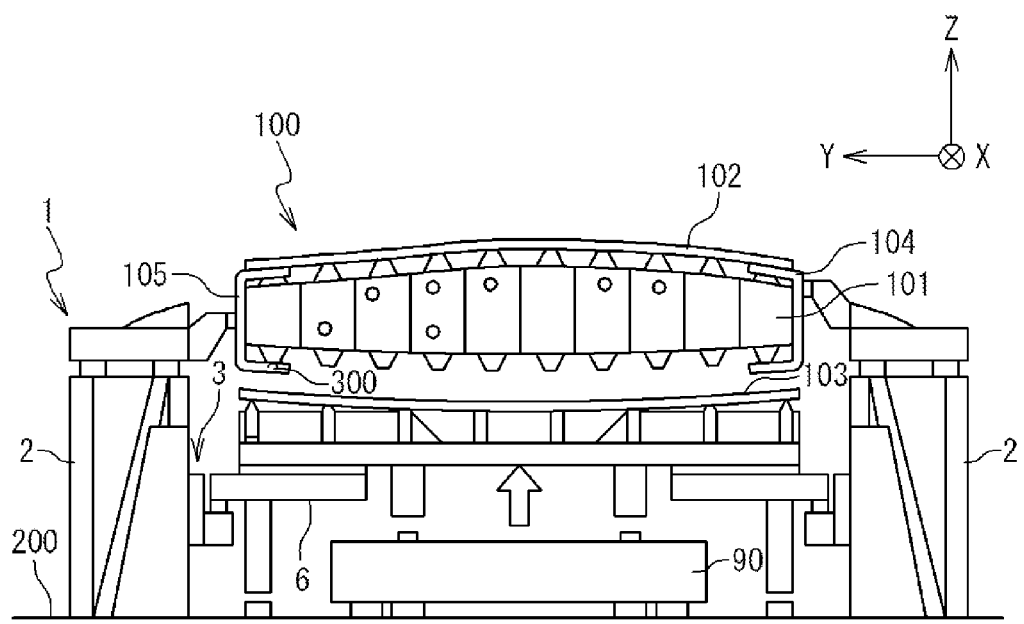
FIG. 1 is a front view of an aircraft structure manufacturing apparatus according to a first embodiment of the present invention.

Referring to FIG. 1, the aircraft structure manufacturing apparatus 1 according to a first embodiment of the present invention will be described. The aircraft structure manufacturing apparatus 1 is provided with measure jigs 2, an NC (Numerical Control) positioning unit 3 and a dolly 6. The measure jigs 2 are fixed on the floor 200 and fixedly support a main wing beam structure 100. Thus, the position and posture of the main wing beam structure 100 are fixed to the floor 200. The main wing beam structure 100 is provided with a rib 101, an upper-side panel 102, a leading edge spar 104 and a rear edge spar 105. The upper-side panel 102 forms the upper-side surface of the main wing. The x, y, and z orthogonal coordinate system fixed to the floor 200 is defined. An x-axis direction is a first horizontal direction. A y-axis direction is a second horizontal direction orthogonal to the first horizontal direction. A z-axis direction is a vertical direction. The dolly 6 is a jig to support a lower-side panel 103 to be attached to the main wing beam structure 100. The lower-side panel 103 forms a lower-side surface of the main wing. The dolly 6 is conveyed by AGV (Automated Guided Vehicle) 90 and is transferred to the NC positioning unit 3. The NC positioning unit 3 performs positioning of the dolly 6 with respect to the 3-axial translation and the 3-axial rotation based on numerical data. The NC positioning unit 3 rotates the dolly 6 around a virtual rotation axis which passes a rotation center 300. The rotation center 300 is fixed to the floor 200, and therefore, is fixed to the main wing beam structure 100. For example, the position of the rotation center 300 is coincident with the position of a reference hole which is formed in a rear edge spar 105.

Figure 2:
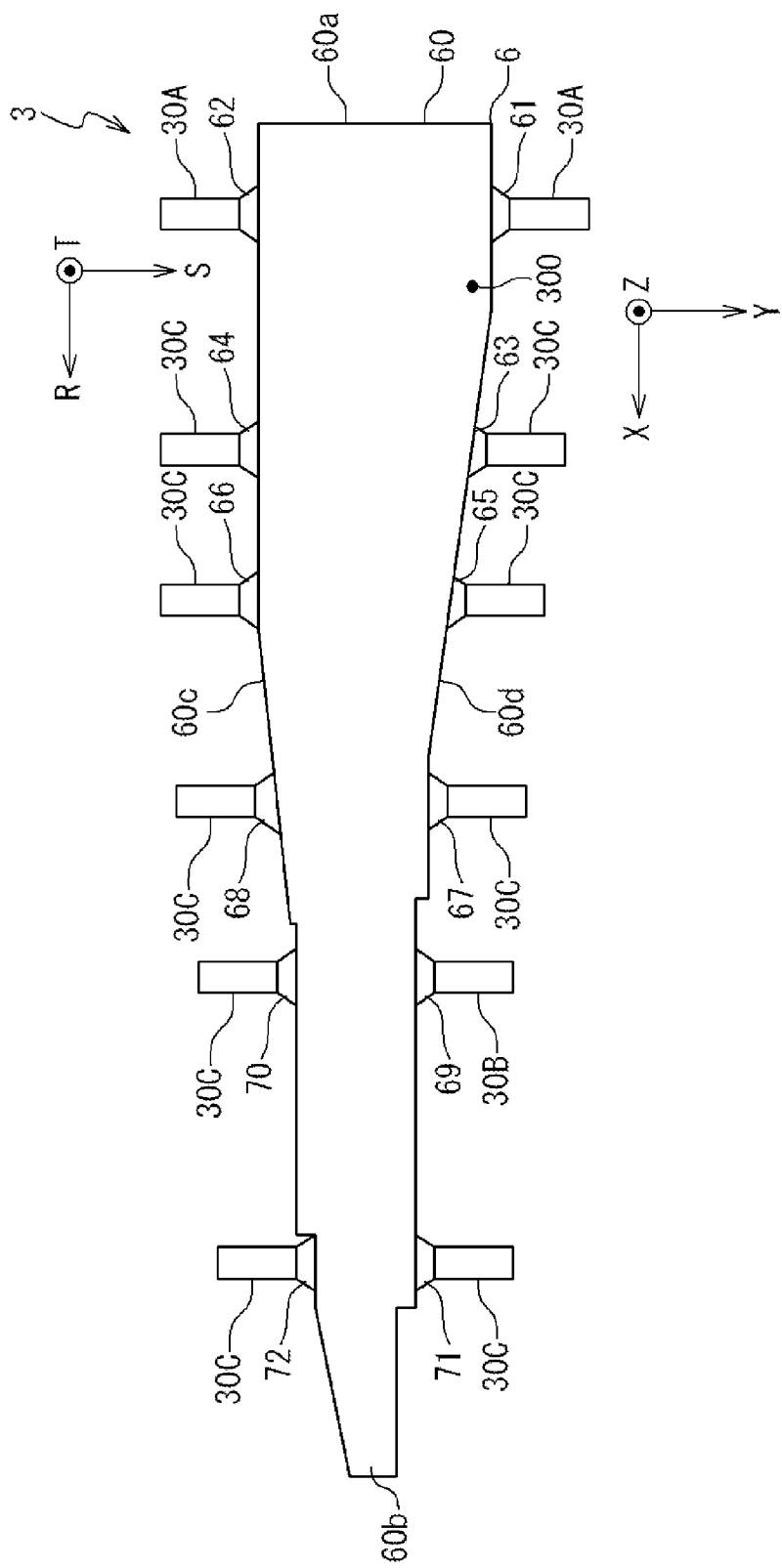
FIG. 2 is a top view of a NC (Numerical Control) positioning unit and a dolly provided for the aircraft structure manufacturing apparatus.

Referring to FIG. 2, the dolly 6 is provided with a dolly body 60 on which the lower-side panel 103 is installed. An orthogonal coordinate system of R, S and T fixed to the dolly body 60 is defined. The dolly body 60 is provided with a fuselage side 60a, a wing end side 60b, a leading edge side 60c and a rear edge side 60d. The fuselage side 60a and the wing end side 60b are located on both ends of the dolly body 60 in the R-axis direction. The leading edge side 60c and the rear edge side 60d are located on the both sides of the dolly body 60 in the S-axis direction and are extend in the R-axis direction. The lower-side panel 103 is set on the dolly body 60 such that the fuselage side of the lower-side panel 103 is arranged above the fuselage side 60a, the wing end side of the lower-side panel 103 is arranged above on the wing end side 60b, the leading edge side of the lower-side panel 103 is arranged above the leading edge side 60c, and the rear edge side of the lower-side panel 103 is arranged above the rear edge side 60d. The dolly 6 has portions 61, 63, 65, 67, 69 and 71 arranged along the rear edge side 60d from the fuselage side 60a to the wing end side 60b, and portions 62, 64, 66, 68, 70 and 72 arranged along the leading edge side 60c from the fuselage side 60a to the wing end side 60b. The R-axis coordinates of the portions 61 and 62 are the same, and the R-axis coordinates of the portions 63 and 64 are the same. The R-axis coordinates of the portions 65 and 66 are the same, and the R-axis coordinates of the portions 67 and 68 are the same. The R-axis coordinates of the portions 69 and 70 are the same, and the R-axis coordinates of the portions 71 and 72 are the same.

The NC positioning unit 3 is provided with two lift stands 30A to respectively support portions 61 and 62, nine lift stands 30C to respectively support portions 63 to 68, and 70 to 72, and a lift stand 30B to support portion 69. That is, 12 lift stands support 12 portions, respectively. The NC positioning unit 3 receives the dolly 6 from the AGV 90 in a state that for example, the R-axis direction is parallel to the x-axis direction, the S-axis direction is parallel to the y-axis direction, and the T-axis direction is parallel to the z-axis direction. While the dolly 6 is supported by the NC positioning unit 3, the R-axis direction is held in approximately parallel to the x-axis direction, the S-axis direction is held in approximately parallel to the y-axis direction, and the T-axis direction is held in approximately parallel to the z-axis direction.

Figure 3:
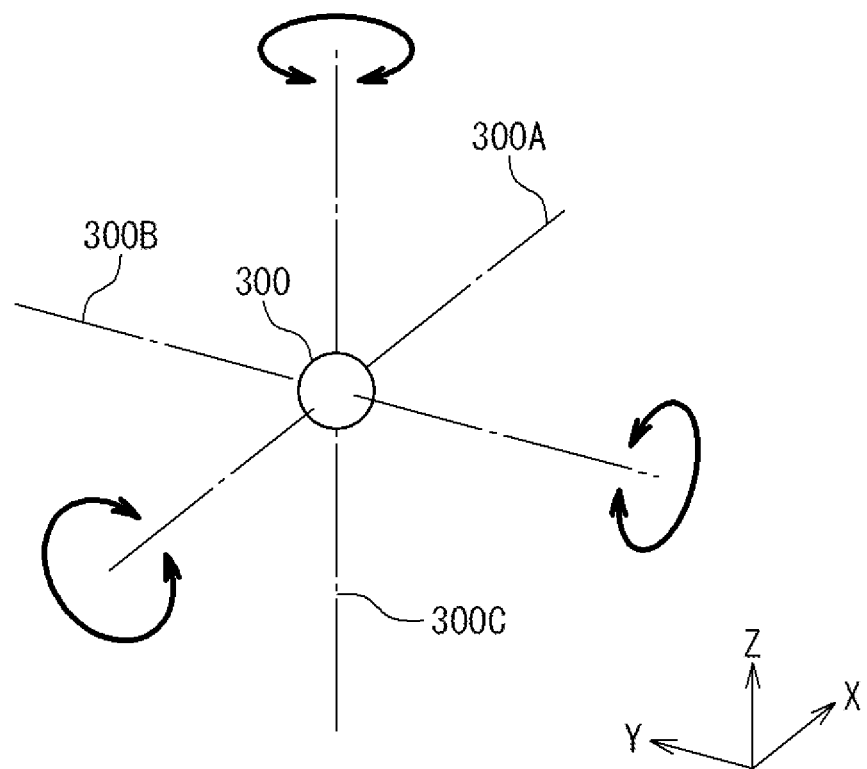
FIG. 3 shows rotation centers and three rotation axes which pass through rotation centers.

Referring to FIG. 3, a rotation axis 300A which passes through the rotation center 300 and is in parallel to the x-axis, a rotation axis 300B which passes through the rotation center 300 and is parallel to the y-axis, and a rotation axis 300C which passes through the rotation center 300 and is parallel to the z-axis, are shown. The NC positioning unit 3 translates the dolly 6 in the x-axis direction, translates the dolly 6 in the y-axis direction, and translates the dolly 6 in the z-axis direction, and rotates the dolly 6 around the rotation axis 300A, rotates the dolly 6 around the rotation axis 300B, and rotates the dolly 6 around the rotation axis 300C.

Figure 4:
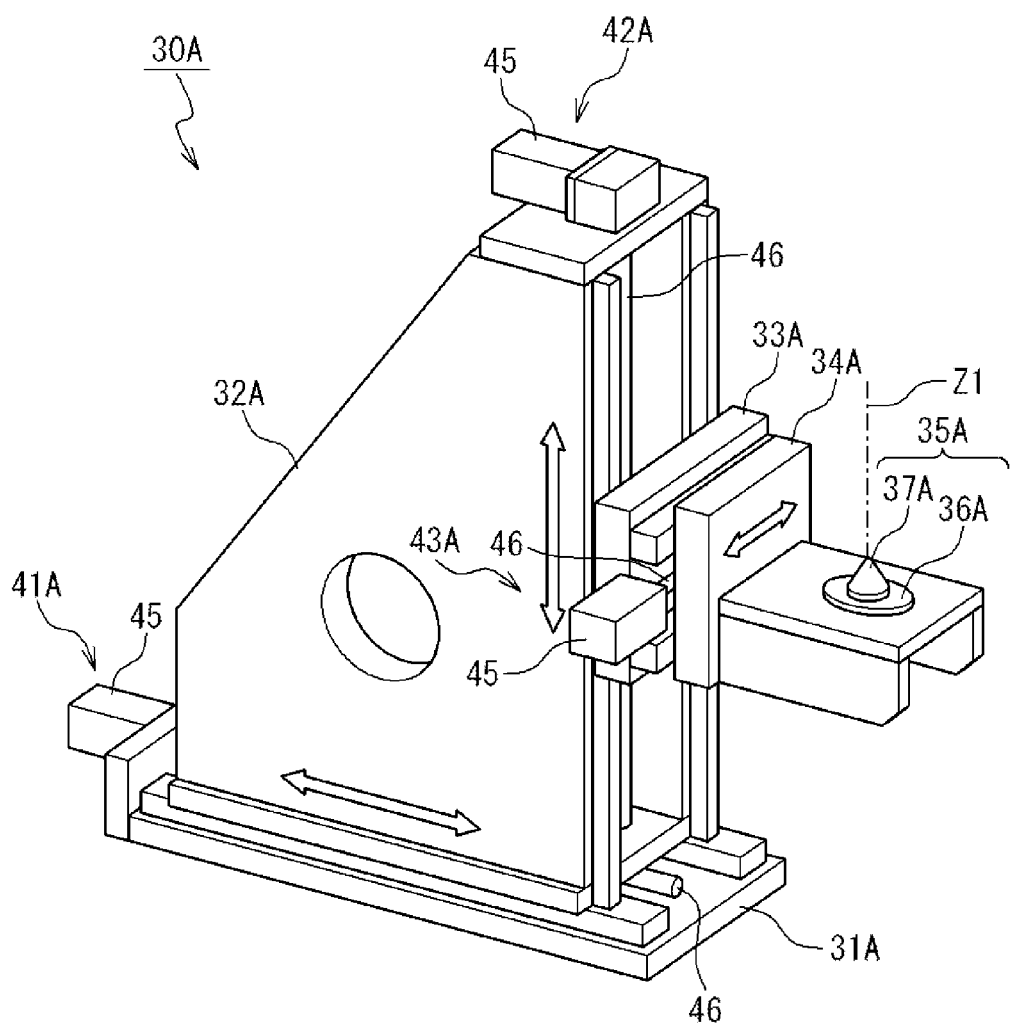
FIG. 4 is a perspective view of a lift stand provided for an NC positioning unit.

Referring to FIG. 4, the lift stand 30A is provided with a base 31A, a y-axis slide unit 32A, a z-axis slide unit 33A, a supporting unit 34A as an x-axis slide unit, a dolly receiving section 35A, a servo system 41A, a servo system 42A, and a servo system 43A. Each of the servo system 41A, the servo system 42A and the servo system 43A is provided with a servomotor 45 and a ball screw 46. The servo system 41A is provided for the base 31A, the servo system 42A is provided for the y-axis slide unit 32A, and the servo system 43A is provided for the z-axis slide unit 33A. The dolly receiving section 35A is provided for the supporting unit 34A and has a receiving base 36A and a pin 37A. The center axis Z1 of the pin 37A is parallel to the z-axis direction. The base 31A is fixed on the floor 200. The base 31A supports the y-axis slide unit 32A and guides straightly into the y-axis direction. The servo system 41A drives the y-axis slide unit 32A into the y-axis direction and positions it. The z-axis slide unit 33A supports and guides the y-axis slide unit 32A straightly into the z-axis direction. The servo system 42A drives the z-axis slide unit 33A into the z-axis direction and positions it. The z-axis slide unit 33A supports the support unit 34A and guides straightly into the x-axis direction. The servo system 43A drives the support unit 34A into the x-axis direction and positions it. Therefore, the servo system 41A drives the support unit 34A into the y-axis direction and positions it. The servo system 42A drives the support unit 34A into the z-axis direction and positions it.

A limit switch (not shown) is provided for the base 31A to limit a stroke (a movement range) of the y-axis slide unit 32A in the Y-axis. The servo system 41A stops the y-axis slide unit 32A based on a signal from the limit switch. As a result, the supporting unit 34A stops the movement in the Y-axis. A limit switch (not shown) is provided for the y-axis slide unit 32A to limit a stroke of the z-axis slide unit 33A in the z-axis direction. The servo system 42A stops the z-axis slide unit 33A based on a signal from the limit switch. As a result, the supporting unit 34A stops a movement in the z-axis direction. A limit switch (not shown) is provided for the z-axis slide unit 33A to limit a stroke of the supporting unit 34A in the x-axis direction. The servo system 43A stops the supporting unit 34A based on a signal from the limit switch.

Figure 5:
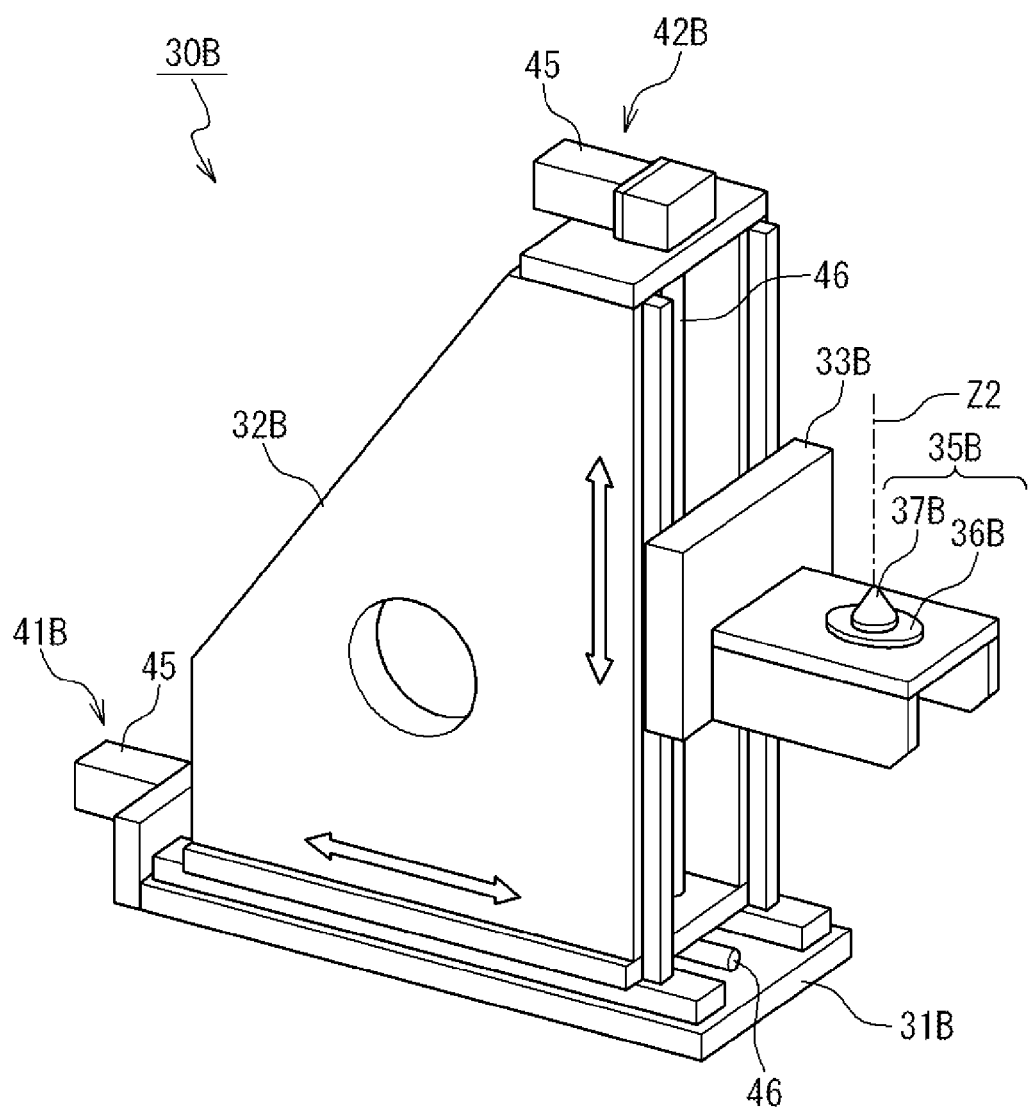
FIG. 5 is a perspective view of another lift stand provided for the NC positioning unit.

Referring to FIG. 5, the lift stand 30B is provided with a base 31B, a y-axis slide unit 32B, a supporting unit 33B as the z-axis slide unit, a dolly receiving section 35B, a servo-system 41B and a servo-system 42B. Each of the servo-system 41B and the servo-system 42B is provided with a servomotor 45 and a ball screw 46. The servo system 41B is provided for the base 31B and the servo system 42B is provided for the y-axis slide unit 32B. The dolly receiving section 35B is provided for the supporting unit 33B and has a receiving base 36B and a pin 37B. The enter axis Z2 of the pin 37B is parallel to the z-axis direction. The base 31B is fixed on the floor 200. The base 31B supports the y-axis slide unit 32B and guides straightly into the y-axis direction. The servo system 41B drives the y-axis slide unit 32B into the y-axis direction and positions it. The y-axis slide unit 32B supports the supporting unit 33B and guides straightly into the z-axis direction. The servo system 42B drives the supporting unit 33B into the z-axis direction and positions it. Therefore, the servo system 42B drives the supporting unit 33B into the z-axis direction and positions it.

The limit switch (the not shown) is provided for base 31B to limit a stroke of the y-axis slide unit 32B in the Y-axis. The servo system 41B stops the y-axis slide unit 32B based on a signal from the limit switch. As a result, the supporting unit 32B stops the movement in the Y-axis. A limit switch (not shown) is provided for the y-axis slide unit 32B to limit a stroke of the supporting unit 33B in the z-axis direction. The servo system 42B stops the supporting unit 33B based on a signal from the limit switch.

Figure 6:
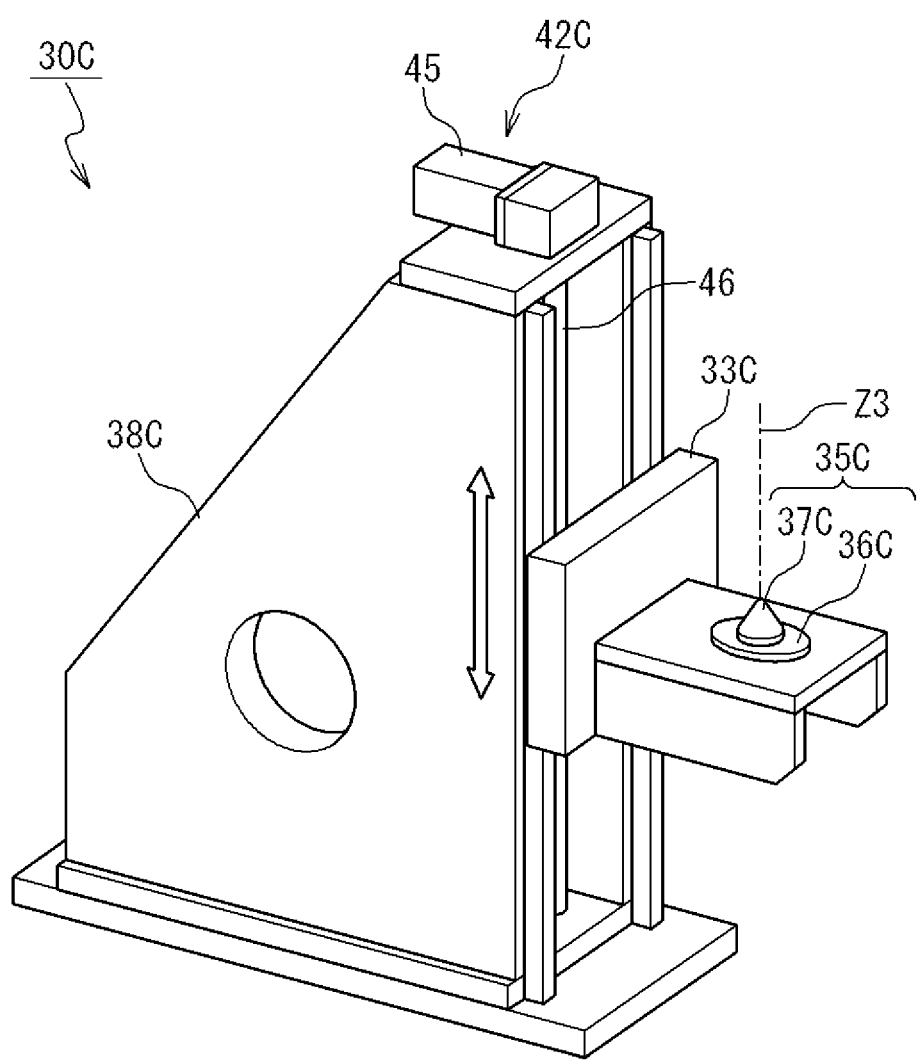
FIG. 6 is a perspective view of another lift stand provided for the NC positioning unit.

Referring to FIG. 6, the lift stand 30C is provided with a slide unit supporting section 38C, a supporting unit 33C as the z-axis slide unit, a dolly receiving section 35C, and a servo system 42C. The servo system 42C is provided with a servomotor 45 and a ball screw 46. The servo system 42C is provided for the slide unit supporting section 38C. The dolly receiving section 35C is provided for the supporting unit 33C and has a receiving base 36C and a pin 37C. The center axis Z3 of the pin 37C is parallel to the z-axis direction. The slide unit supporting section 38C is fixed on the floor 200. The slide unit supporting section 38C supports the supporting unit 33C and guides straightly into the z-axis direction. The servo system 42C drives the supporting unit 33C to the z-axis direction and positions it.

A limit switch (the not shown) is provided for the slide unit supporting section 38C to limit a stroke of the supporting unit 33C in the z-axis direction. The servo system 42C stops the supporting unit 33C based on a signal from the limit switch.

Figure 7:
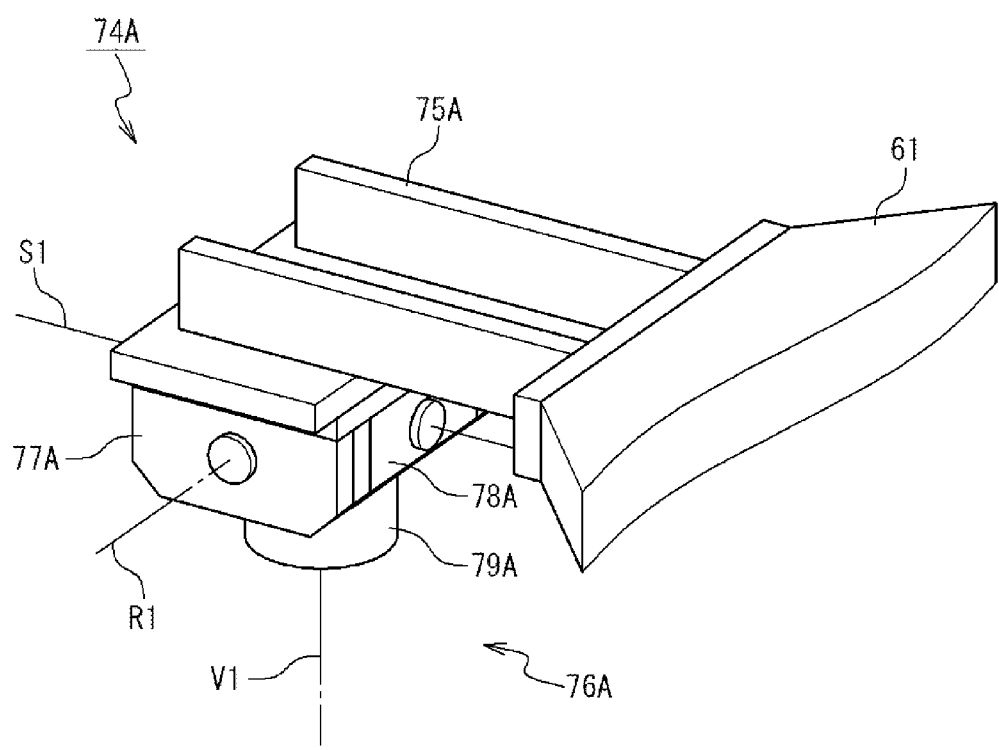
FIG. 7 is a perspective view of a leg unit provided for the dolly.

Referring to FIG. 7, the dolly 6 is provided with a leg unit 74A which is provided for the portion 61. The leg unit 74A is provided with a base section 75A and a 2-axis gimbal 76A. The base section 75A is fixedly attached to the portion 61. The 2-axis gimbal 76A is referred to as a floating mechanism, too. The 2-axis gimbal 76A is provided with a gimbal base section 77A, a first swinging body 78A and a second swinging body 79A. The second swinging body 79A has a tubular shape. The gimbal base section 77A is fixedly installed to the base section 75A. The gimbal base section 77A supports the first swinging body 78A for a swinging operation of the first swinging body 78A around the swing axis R1. The first swinging body 78A supports the second swinging body 79A for a swinging operation of the second swinging body 79A around the swing axis S1. The swing axis R1 is parallel to the R-axis and the swing axis S1 is parallel to the S axis. The swing axis R1 and the swing axis S1 are orthogonal to each other. The center axis V1 of the second swinging body 79A passes through the point of intersection of the swing axis R1 and the swing axis S1. When the dolly 6 is not supported by the NC positioning unit 3, the 2-axis gimbal 76A keeps a state that the central axis V1 is parallel to the z-axis direction due to the weight of the second swinging body 79A. The dolly 6 is provided with another leg unit 74A. Another leg unit 74A is provided for the portion 62.

Figure 8:
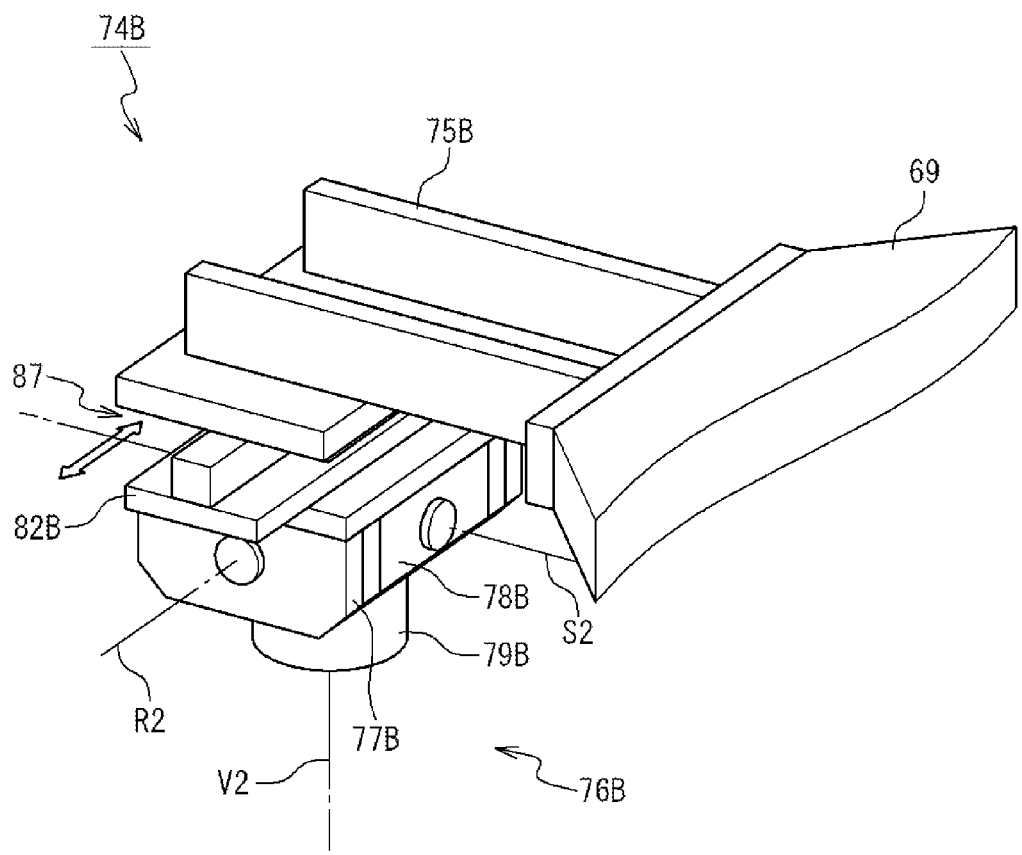
FIG. 8 is a perspective view of another leg unit provided for the dolly.

Referring to FIG. 8, the dolly 6 is provided with a leg unit 74B which is provided for the portion 69. The leg unit 74B is provided with a 1-axis sliding mechanism 87 and the 2-axis gimbal 76B. The 1-axis sliding mechanism 87 is provided with a base section 75B and an R-axis slide body 82B. The base section 75B is fixedly attached to the portion 69. The base section 75B guides the R-axis slide body 82B straightly into the R-axis direction. The 2-axis gimbal 76B is referred to a floating mechanism, too. The 2-axis gimbal 76B is provided with a gimbal base section 77B, a first swinging body 78B and a second swinging body 79B. The second swinging body 79B has a tubular shape. The gimbal base section 77B is fixedly attached to the R-axis slide body 82B. The gimbal base section 77B supports the first swinging body 78B such that the first swinging body 78B can swing around the swing axis R2. The first swinging body 78B supports the second swinging body 79B such that the second swinging body 79B can swing around the swing axis S2. The swing axis R2 is parallel to the R-axis and the swing axis S2 is parallel to the S-axis. The swing axis R2 and the swing axis S2 are orthogonal to each other. The center axis V2 of the second swinging body 79B passes through the point of intersection of the swing axis R2 and the swing axis S2. When the dolly 6 is not supported by the NC positioning unit 3, the 2-axis gimbal 76B keeps a state that the center axis V2 is parallel to the z-axis direction due to the weight of the second swinging body 79B.

Figure 9:
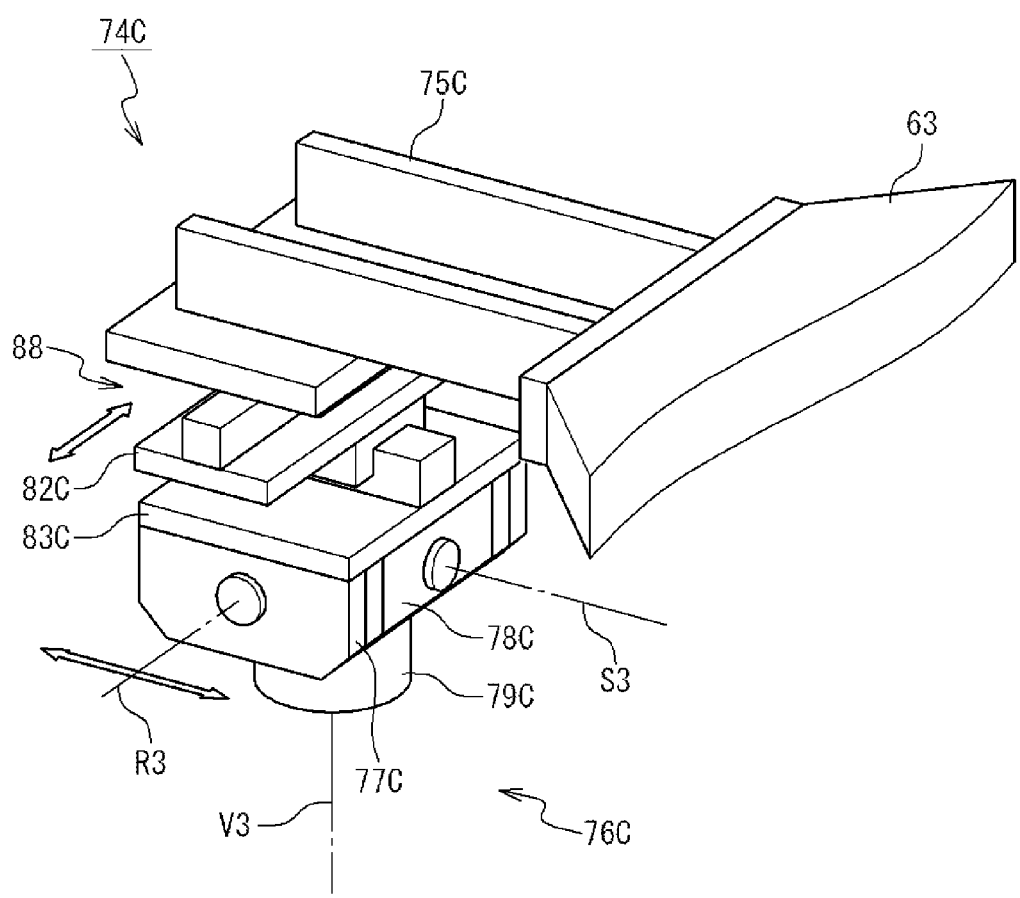
FIG. 9 is a perspective view of another leg unit provided for the dolly.

Referring to FIG. 9, the dolly 6 is provided with a leg unit 74C which is provided for the portion 63. The leg unit 74C is provided with a 2-axis sliding mechanism 88 and a 2-axis gimbal 76C. The 2-axis sliding mechanism 88 is provided with a base section 75C, an R-axis slide body 82C and an S-axis slide body 83C. The base section 75C is fixedly attached to the portion 63. The base section 75C guides the R-axis slide body 82C straightly into the R-axis direction. The R-axis slide body 82C guides the S-axis slide body 83C straightly into the S-axis direction. The 2-axis gimbal 76C is referred to as a floating mechanism, too. The 2-axis gimbal 76C is provided with a gimbal base section 77C, a first swinging body 78C and a second swinging body 79C. The second swinging body 79C has a tubular shape. The gimbal base section 77C is fixedly attached to the S-axis slide body 83C. The gimbal base section 77C supports the first swinging body 78C such that the first swinging body 78C can swing around the swing axis R3. The first swinging body 78C supports the second swinging body 79C such that the second swinging body 79C can swing around the swing axis S3. The swing axis R3 is parallel to the R-axis and the swing axis S3 is parallel to the S-axis. The swing axis R3 and the swing axis S3 are orthogonal to each other. The center axis V3 of the second swinging body 79C passes through the point of intersection of the swing axis R3 and the swing axis S3. When the dolly 6 is not supported on the NC positioning unit 3, the 2-axis gimbal 76C keeps a state that the center axis V3 is parallel to the z-axis direction due to the weight of the second swinging body 79C. The dolly 6 is provided with other leg units 74C. The other leg units 74C are provided for the portions 63 to 68, and 70 to 72, respectively.

Figure 10:
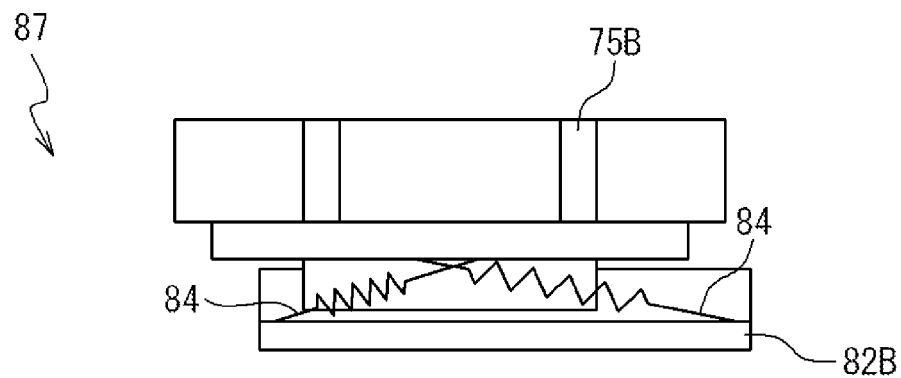
FIG. 10 shows a tension spring provided for the leg unit.

Referring to FIG. 10, the 1-axis sliding mechanism 87 is provided with a tension spring 84. The tension spring 84 biases the base section 75B and the R-axis slide body 82B such that the R-axis direction relative positions of the base section 75B and the R-axis slide body 82B return to slide center positions. The 2-axis sliding mechanism 88 is provided with a tension spring 84 which biases the base section 75C and the R-axis slide body 82C such that the R-axis direction relative positions of the base section 75C and the R-axis slide body 82C return to slide center positions.

Figure 11:
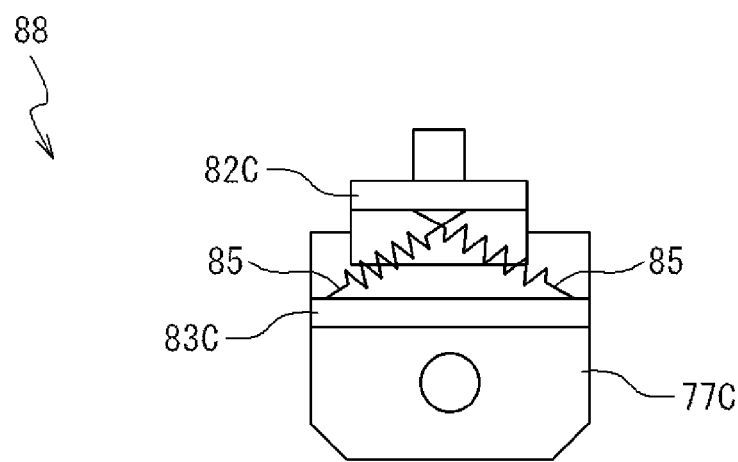
FIG. 11 shows another tension spring provided for the leg unit.

Referring to FIG. 11, the 2-axis sliding mechanism 88 is provided with a tension spring 85. The tension spring 85 biases the R-axis slide body 82C and the S-axis slide body 83C such that the S-axis direction relative positions of the R-axis slide body 82C and the S-axis slide body 83C return to slide center positions.

Figure 12:
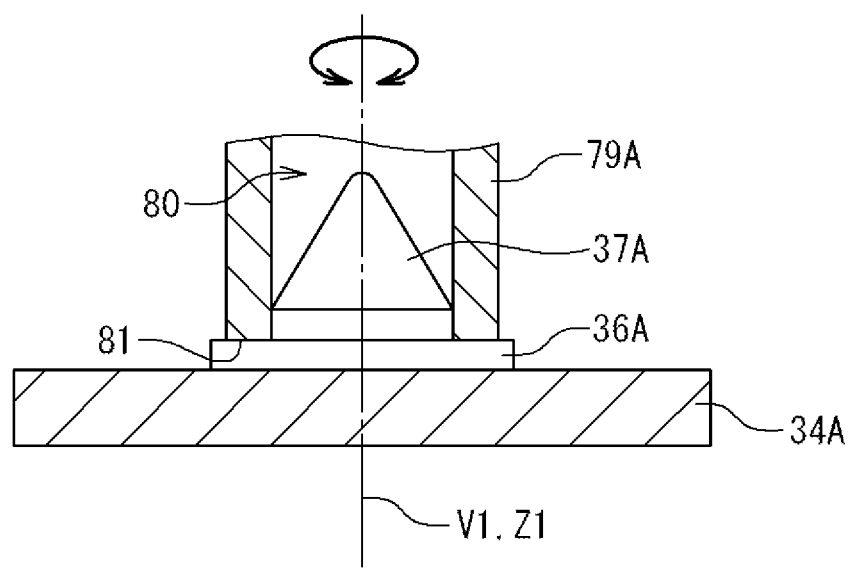
FIG. 12 shows an engagement state of the lift stand and the leg unit.

Referring to FIG. 12, an engagement state of the lift stand 30A and the leg unit 74A will be described. The second swinging body 79A is provided with an end face 81. A hole 80 is formed in the second swinging body 79A to open in the end face 81. A center axis of the hole 80 and a center axis V1 are arranged on the same straight line. The second swinging body 79A is put on the receiving base 36A such that the pin 37A is arranged in the hole 80 in the state that the end face 81 turns downwardly. At this time, the center axis V1 and the center axis Z1 are arranged on a same straight line, and the second swinging body 79A and the pin 37A form a rotation axis. The second swinging body 79A is possible to rotate around the center axis Z1 to the supporting unit 34A. The pin 37A prevents that the second swinging body 79A moves into the x-axis direction and the y-axis direction to the supporting unit 34A.

The second swinging bodies 79B and 79C are formed like the second swinging body 79A. The second swinging bodies 79B and 79C are supported by the supporting units 33B and 33C, respectively, like the second swinging body 79A.

Figure 13:
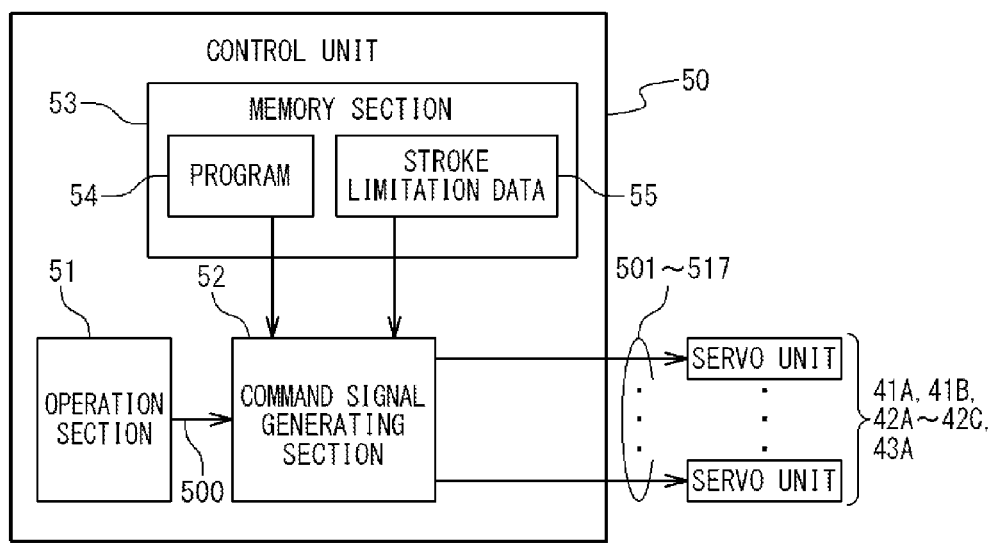
FIG. 13 is a block diagram of the control unit provided for the NC positioning unit.

Referring to FIG. 13, the NC positioning unit 3 is provided with a control unit 50. The control unit 50 controls 17 servo systems 41A, 41B, 42A to 42C, 43A provided for the 12 lift stands 30A to 30C. The control unit 50 is provided with an operation section 51, a command signal generating section 52 and a memory section 53. The operation section 51 is provided with a touch panel and a push button switch group. An operator operates the touch panel and the push button switch group. The command signal generating section 52 is provided with an arithmetic and logic unit. The memory section 53 stores a program 54 and stroke limitation data 55. The stroke limitation data 55 is for the lower-side panel 103 and limits a stroke of each of the 17 servo systems 41A, 41B, 42A to 42C, and 43A. The command signal generating section 52 operates based on the program 54. The operation section 51 generates an operation signal 500 based on the operation by the operator. The operation signal 500 indicates a movement of the dolly 6 specified by the operator. The movement of the dolly 6 is specified as follows: for example, a translation in the X-, Y- or z-axis direction by a specified distance, rotation around the rotation axis 300A, 300B or 300C by a specified angle, the translation in the x-, y- or z-axis direction for a period in which a push button switch is pushed, or rotation around the rotation axis 300A, 300B or 300C for a period in which a push button switch is pushed.

The command signal generating section 52 generates 17 command signals 501 to 517 based on the operation signal 500 and the stroke limitation data 55, and outputs the command signals 501 to 517 to the 17 servo systems 41A, 41B, 42A to 42C, and 43A.

The aircraft structure manufacturing method which uses aircraft structure manufacturing apparatus 1 will be described below. A case that the aircraft structure is a main wing structure will be described but the aircraft structure is not limited to the main wing structure.

First, the dolly 6 is transferred from the AGV 9 to the NC positioning unit 3. In the state that the dolly 6 is not supported by the NC positioning unit 3, relative positions of the base section 75B and the R-axis slide body 82B, and relative positions of the base section 75C and the R-axis slide body 82C are arranged on the slide center positions by the tension spring 84. Relative positions of the R-axis slide body 82C and the S-axis slide body 83C are arranged in the slide center positions by the tension spring 85. Therefore, the supporting unit 34A, the supporting unit 33B and the supporting unit 33C are only arranged in fixed positions, and the AGV 90 on which the dolly 6 is mounted is only arranged on a predetermined position. Thus, the position alignment for the transfer is completed. The NC positioning unit 3 supports the dolly 6 received from the AGV 90 in the above-mentioned manner.

The control unit 50 controls the servo systems 41A, 41B, 42A to 42C and 43A based on the operation by the operator such that the dolly 6 is translated in the x-axis direction. The control unit 50 controls the servo system 41A, 41B, 42A to 42C and 43A based on the operation by the operator such that the dolly 6 is translated in the y-axis direction. The control unit 50 controls the servo system 41A, 41B, 42A to 42C and 43A based on the operation by the operator such that the dolly 6 is translated in the z-axis direction.

The control unit 50 controls the servo systems 41A, 41B, 42A to 42C and 43A based on the operation by the operator such that the dolly 6 is rotated around the rotation axis 300A. The control unit 50 controls the servo system 41A, 41B, 42A to 42C and 43A based on the operation by the operator such that the dolly 6 is rotated around the rotation axis 300B. The control unit 50 controls the servo systems 41A, 41B, 42A to 42C and 43A based on the operation by the operator such that the dolly 6 is rotated around the rotation axis 300C.

The posture of the dolly 6 is changed through the rotations around the rotation axes 300A and 300B. Because the positions in the vertical direction of the slide units 34A, 33B and 33C respectively supporting the portions 61 to 72 can be independently controlled by the servo system 42A to 42C, it is possible to change the posture of the dolly 6.

It should be noted that the strengths of tension spring 84 and the tension spring 85 are adjusted such that the tension spring 84 and the tension spring 85 do not affect the positioning of the dolly 6 by the NC positioning unit 3.

The portion 61 receives force in the x-axis direction and force in the y-axis from the lift stand 30A. The portion 62 receives force in the x-axis direction and force in the y-axis from another lift stand 30A. The portion 69 receives force in the y-axis from the lift stand 30B. The portion 61 and the portion 62 are separated from each other in the y-axis direction, and the portion 61 and the portion 69 are separated from each other in the x-axis direction. These are advantageous when the translation of the dolly 6 in the x-axis direction and in the y-axis direction, and the rotation around the rotation axis 300C are performed.

The limitation of a stroke by using the stroke limitation data 55 will be described below. The command signal generating section 52 calculates a command value to each of the 17 servo systems based on the operation signal 500. The command value corresponds to the position of the X-, -Y or z-axis direction. The stroke limitation data 55 sets an upper limit and a lower limit to the command value for each of the 17 servo systems. When there are all the command values between the upper limits and the lower limits, the command signals 501 to 517 indicate calculated command values. When the command value calculated for at least one servo system at some time is higher than an upper limit or is lower than the lower limit, the command signal 501 to the command signal 517 continue to retain the command values at that time even after that time. That is, when at least one command value is higher than the upper limit or is lower than the lower limit, the 17 servo systems perform a predetermined position holding operation. That is, when the movement of the dolly 6 specified by the operator and shown by the operation signal 500 conflicts the stroke limitation data 55, the control unit 50 controls the 17 servo systems 41A, 41B, 42A to 42C and 43A provided for the 12 lift stands 30A, 30B and 30C to perform the predetermined position holding operation. Therefore, it can be prevented that the lower-side panel 103 collides with the main wing skeleton structure 100. Moreover, it can be prevented that the dolly 6 moves to be not intended by the operator because the dolly 6 comes to rest.

Figure 14:
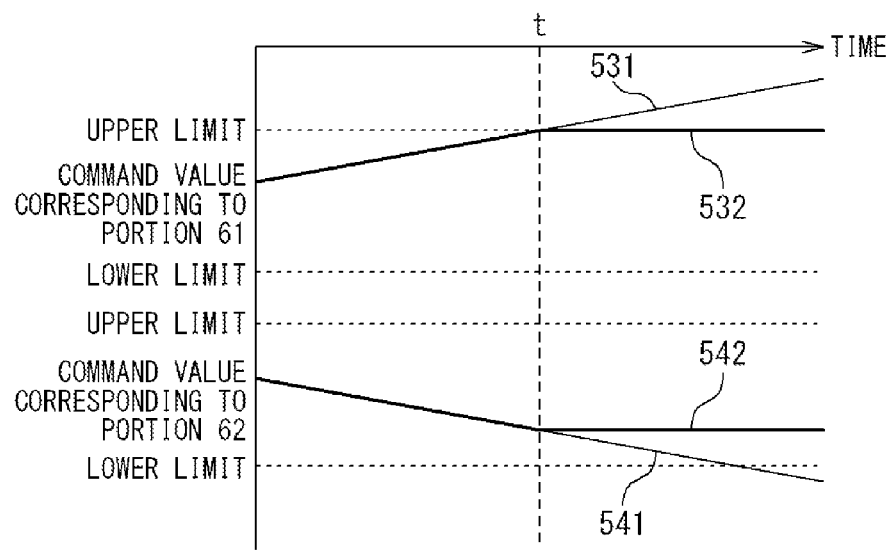
FIG. 14 is a flow chart showing a process executed by the control unit.

Referring to FIG. 14, the limitation on the stroke by using the stroke limitation data 55 will be described. Here, the description is given under the condition that the servo system 42A provided for the lift stand 30A which supports the portion 61 operates in response to the command signal 501, and the servo system 42A provided for the lift stand 30A which supports the portion 62 operates in response to the command signal 502. The calculated value 531 is a command value calculated for the servo system 42A corresponding to the portion 61. The calculated value 541 is a command value calculated for the servo system 42A corresponding to the portion 62. Before time t, the calculated values 531 and 541 are between the upper limit and the lower limit. After the time t, the calculated value 531 is higher than the upper limit. Before the time t, the command signal 501 shows the calculated value 531 and the command signal 502 shows the calculated value 541. After the time t, the command signal 501 indicates a constant value 532. The constant value 532 is equal to the calculated value 531 at the time t. After the time t, even if the calculated value 541 is between the upper limit and the lower limit, the command signal 502 indicates a constant value 542. The constant value 542 is equal to the calculated value 541 at the time t.

In the present embodiment, the NC positioning unit 3 can be used to perform not only the positioning of the dolly 6 for supporting the lower-side panel 103, but also the positioning of manufacturing units such as a jig for supporting a rib 101, a jig for supporting a nacelle, and a drilling machine. In this case, only the necessary ones of the 12 lift stands 30A, 30B, and 30C are used. For example, a case is considered that the two lift stands 30A, the one lift stand 30B and the one lift stand 30C are used, a case is considered that the two lift stands 30A and the two lift stands 30C are used, and a case is considered that the four lift stands 30C are used. Moreover, in each of these cases, the lift stand 30C may be added. The NC positioning unit 3 is possible to cope with various positioning objects by changing the program 54 and the stroke limitation data 55.

In the present embodiment, the number of servo systems can be reduced by combining the lift stand 30B and the leg unit 74B and combining the lift stand 30C and the leg unit 74C. It should be noted that instead of providing the 1-axis sliding mechanism 87 for the leg unit 74B, a 1-axis sliding mechanism to slide the dolly receiving section 35B into the x-axis direction to the supporting unit 33B may be provided between the supporting unit 33B and the dolly receiving section 35B. Also, instead of providing the 2-axis sliding mechanism 88 for the leg unit 74C, the 2-axis sliding mechanism to slide the dolly receiving section 35C into the x-axis direction and the y-axis direction to the supporting unit 33C may be provided between the supporting unit 33C and the dolly receiving section 35C.

As described above, the present invention has been described with reference to the embodiments but the present invention is not limited to the embodiments. Various modifications may be made to the above embodiments.

This patent application claims a priority on convention based on Japanese Patent Application No. 2009-047305 filed on Feb. 27, 2009, and the disclosure thereof is incorporated herein by reference.

The invention claimed is:

1. An aircraft structure manufacturing apparatus comprising:
   a first supporting unit configured to support a first portion of a positioning object;
   a second supporting unit configured to support a second portion of said positioning object;
   a third supporting unit configured to support a third portion of said positioning object;
   a fourth supporting unit configured to support a fourth portion of said positioning object;
   a servo system group; and
   a control unit configured to control said servo system group,
   wherein said servo system group comprises:
      a first vertical axis servo system configured to drive said first supporting unit in a vertical direction;
      a second vertical axis servo system configured to drive said second supporting unit in the vertical direction;
      a third vertical axis servo system configured to drive said third supporting unit in the vertical direction; and
      a fourth vertical axis servo system configured to drive said fourth supporting unit in the vertical direction,
   wherein said positioning object is a jig configured to support a part of an aircraft structure,
   wherein said servo system group further comprises:
      a first horizontal axis first servo system configured to drive said first supporting unit in a first horizontal direction;
      a second horizontal axis first servo system configured to drive said first supporting unit in a second horizontal direction orthogonal to the first horizontal direction;
      a first horizontal axis second servo system configured to drive said second supporting unit in the first horizontal direction;
      a second horizontal axis second servo system configured to drive said second supporting unit in the second horizontal direction; and
      a first horizontal axis third servo system configured to drive said third supporting unit in the first horizontal direction,
   wherein a first rotation axis parallel to said vertical direction and a first 2-axis gimbal are provided between said first supporting unit and said first portion,
   wherein a second rotation axis parallel to said vertical direction and a second 2-axis gimbal are provided between said second supporting unit and said second portion,
   wherein a third rotation axis parallel to said vertical direction, a third 2-axis gimbal and a 1-axis sliding mechanism are provided between said third supporting unit and said third portion, and
   wherein a fourth rotation axis parallel to said vertical direction, a fourth 2-axis gimbal and a 2-axis sliding mechanism are provided between said fourth supporting unit and said fourth portion.

2. The aircraft structure manufacturing apparatus according to claim 1, wherein said positioning object is provided with said first to fourth 2-axis gimbals, said 1-axis sliding mechanism and said 2-axis sliding mechanism,
   wherein said first 2-axis gimbal comprises:
   a first gimbal base attached to the first portion; and
   a first swinging body supported by said first gimbal base to swing around 2 axes which are orthogonal to each other,
   wherein a first pin which is arranged in a hole formed in said first swinging body and a first receiving base on which said first swinging body is put are provided for said first supporting unit, and said first pin and said first swinging body form said first rotation axis,
   wherein said second 2-axis gimbal comprises:
   a second gimbal base attached to said second portion; and
   a second swinging body supported by said second gimbal base to swing around the 2 axes which are orthogonal to each other,
   wherein a second pin which is arranged in a hole formed in said second swinging body and a second receiving base on which said second swinging body is put are provided for said second supporting unit, and said second pin and said second swinging body form said second rotation axis,
   wherein said 1-axis sliding mechanism comprises:
   a first slide base attached to said third portion; and
   a first slide body configured to slide to said first slide base,
   wherein said third 2-axis gimbal comprises:
   a third gimbal base attached to said first slide body; and
   a third swinging body supported by said third gimbal base so as to swing around 2 axes which are orthogonal to each other,
   wherein a third pin which is arranged in a hole formed in said third swinging body and a third receiving base on which said third swinging body is put are provided for said third supporting unit, and said third pin and said third swinging body form said third rotation axis,
   wherein said 2-axis sliding mechanism comprises:
   a second slide base attached to said fourth portion;
   a slide intermediate body configured to slide in a first slide direction to said second slide base; and a second slide body configured to slide in a second slide direction, which is orthogonal to said first slide direction, to said slide intermediate, wherein said fourth 2-axis gimbal comprises:

a fourth gimbal base attached to said second slide body; and a fourth swinging body supported in said fourth gimbal base to swing around 2 axes which are orthogonal to each other, and wherein a fourth pin which is arranged in a hole formed in said fourth swinging body and a fourth receiving base on which said fourth swinging body is put are provided for said fourth supporting unit, and said fourth pin and said fourth swinging body form said fourth rotation axis.

3. The aircraft structure manufacturing apparatus according to claim 2, wherein said 1-axis sliding mechanism comprises a first tension spring configured to return relative positions of said first slide base and said first slide body to a slide center position, and said 2-axis sliding mechanism comprises:

a second tension spring configured to return relative positions of said second slide base and said middle slide body to a slide center position; and a third tension spring configured to return relative positions of said middle slide body and said second slide body to a slide center position.

4. The aircraft structure manufacturing apparatus according to claim 1, further comprising:

a measure jig configured to support an attachment object portion of said aircraft structure to which said part should be installed, and wherein said control unit:

controls said servo system group such that said positioning object rotates around a vertical direction rotation axis which is parallel to said vertical direction and passes through a rotation center fixed to said attachment object portion, controls said servo system group such that said positioning object rotates around first horizontal direction rotation axis which is parallel to said first horizontal direction and passes through said rotation center, and controls said servo system group such that said positioning object rotates around a second horizontal direction rotation axis which is parallel to said second horizontal direction and passes through said rotation center.

5. The aircraft structure manufacturing apparatus according to claim 1, wherein said control unit comprises a memory section configured to store stroke limitation data which limits a stroke of said servo system group, and wherein said control unit controls said servo system group based on the stroke limitation data.

6. The aircraft structure manufacturing apparatus according to claim 5, wherein said control unit controls said servo system groups to perform a predetermined position holding operation when a movement of said positioning object specified by an operator conflicts with the stroke limitation data.

* * * * *